(12) United States Patent
Nishioka et al.

(10) Patent No.: US 11,994,316 B2
(45) Date of Patent: May 28, 2024

(54) AIR-COOLING DEVICE

(71) Applicants: TOYOTA JIDOSHA KABUSHIKI KAISHA, Aichi-ken (JP); SUBARU CORPORATION, Tokyo (JP)

(72) Inventors: Hideo Nishioka, Toyota (JP); Yoshihiro Ishikawa, Toyota (JP); Hiroki Tanaka, Toyota (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 256 days.

(21) Appl. No.: 17/692,171

(22) Filed: Mar. 11, 2022

(65) Prior Publication Data

US 2022/0325908 A1 Oct. 13, 2022

(30) Foreign Application Priority Data

Apr. 7, 2021 (JP) ................................. 2021-065239

(51) Int. Cl.
*F24F 7/007* (2006.01)

(52) U.S. Cl.
CPC .................................... *F24F 7/007* (2013.01)

(58) Field of Classification Search
CPC .............................. F24F 7/007; B60K 11/04
See application file for complete search history.

(56) References Cited

U.S. PATENT DOCUMENTS

| | | | | |
|---|---|---|---|---|
| 8,491,038 B2 * | 7/2013 | Challal | ................... | B60R 21/34 296/187.04 |
| 8,540,043 B2 * | 9/2013 | Mehlos | .................. | B60K 13/02 180/68.1 |
| 8,561,738 B2 * | 10/2013 | Charnesky | ........... | B60K 11/085 180/68.1 |
| 8,915,320 B2 * | 12/2014 | Chinta | ................. | B60K 11/085 180/68.1 |
| 2011/0127005 A1 * | 6/2011 | Keerl | ........................ | F01P 3/18 29/401.1 |
| 2020/0079207 A1 | 3/2020 | Iwase et al. | | |

FOREIGN PATENT DOCUMENTS

| | | | | | |
|---|---|---|---|---|---|
| JP | 2008-044387 A | | 2/2008 | | |
| JP | 2010-280275 A | | 12/2010 | | |
| JP | 2015-1155 A | | 1/2015 | | |
| JP | 2020-40562 A | | 3/2020 | | |
| JP | 2020040562 A | * | 3/2020 | ............. | B60K 11/04 |

* cited by examiner

*Primary Examiner* — Lionel Nouketcha
(74) *Attorney, Agent, or Firm* — HAUPTMAN HAM, LLP

(57) ABSTRACT

An air-cooling device includes a radiator, a duct, and a fan. The radiator includes a radiator core and a frame connected to an outer peripheral portion of the radiator core. The duct is disposed forward of the radiator. The duct includes an opening disposed forward of the radiator core and an air guide that extends from the frame to an end of the opening. The fan causes air to flow from the opening to the radiator core. The frame is disposed to extend from a position on one side of a straight line to a position on an opposite side of the straight line, the straight line extending rearward from the end of the opening. A connecting portion between the frame and the air guide is located at a distance from the straight line.

10 Claims, 3 Drawing Sheets

AIR-COOLING DEVICE

CROSS-REFERENCE TO RELATED APPLICATION

This application claims priority to Japanese Patent Application No. 2021-065239 filed on Apr. 7, 2021, incorporated herein by reference in its entirety.

BACKGROUND

1. Technical Field

The technique in the disclosure relates to an air-cooling device.

2. Description of Related Art

An air-cooling device disclosed in Japanese Unexamined Patent Application Publication No. 2020-040562 (JP 2020-040562 A) includes a radiator and a duct (that is, an air guide) disposed forward of the radiator. Air flows into a radiator core from an opening of the duct while a vehicle is traveling, so that the radiator core is cooled. By providing the duct, air can be efficiently introduced to the radiator core.

SUMMARY

An air-cooling device mounted on a vehicle includes a fan. When a vehicle stops or travels at a low speed, the fan causes air to flow into a radiator core. When the fan causes the air to flow into the radiator core, a flow rate of the air flowing into the radiator core is low, which is different from when a vehicle travels at a high speed. Therefore, the air at a high temperature that has passed through the radiator core may pass through a clearance between the radiator and the duct, and flow back into the duct. When such a backflow occurs, a temperature of the air flowing into the radiator core increases, so that cooling efficiency is reduced.

In the disclosure, a technique for restraining a backflow of air when a fan is operated is proposed for an air-cooling device including a radiator and a duct.

The air-cooling device according to one aspect of the present disclosure is mounted on a vehicle. The air-cooling device includes a radiator, a duct, and a fan. The radiator includes a radiator core and a frame connected to an outer peripheral portion of the radiator core. The duct is disposed forward of the radiator. The duct includes an opening disposed forward of the radiator core and an air guide that extends from the frame to an end of the opening. The fan causes air to flow from the opening to the radiator core. The frame is disposed to extend from a position on one side of a straight line to a position on an opposite side of the straight line, the straight line extending rearward from the end of the opening. A connecting portion between the frame and the air guide is located at a distance from the straight line.

In the air-cooling device according to the above aspect, the frame is disposed to extend from a position on one side of a straight line to a position on an opposite side of the straight line, the straight line extending rearward from the end of the opening. Therefore, when the fan is operated, it is difficult for the air that has passed through the vicinity of the end of the opening to flow toward the radiator core. Therefore, the air that has passed through the vicinity of the end of the opening flows toward the space between the connecting portion and the straight line, and flows in a spiral manner in the vicinity of the connecting portion. Therefore, it is difficult for the air that has passed through the radiator core to flow into the clearance at the connecting portion. Therefore, the air that has passed through the radiator core is restrained from passing through the clearance at the connecting portion and flowing back into the duct. As a result, according to this air-cooling device, the radiator core can be efficiently cooled.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an air-cooling device according to one example in the disclosure, a rib that extends along the connecting portion may be provided on a front surface of the frame.

With this configuration, it is difficult for air to flow into the clearance at the connecting portion, and the backflow of the air can be restrained more effectively.

In an air-cooling device according to one example in the disclosure, a rib that extends along the connecting portion may be provided on an inner surface of the air guide.

With this configuration, it is difficult for air to flow into the clearance at the connecting portion, and the backflow of the air can be restrained more effectively.

First Embodiment

Figure 1:
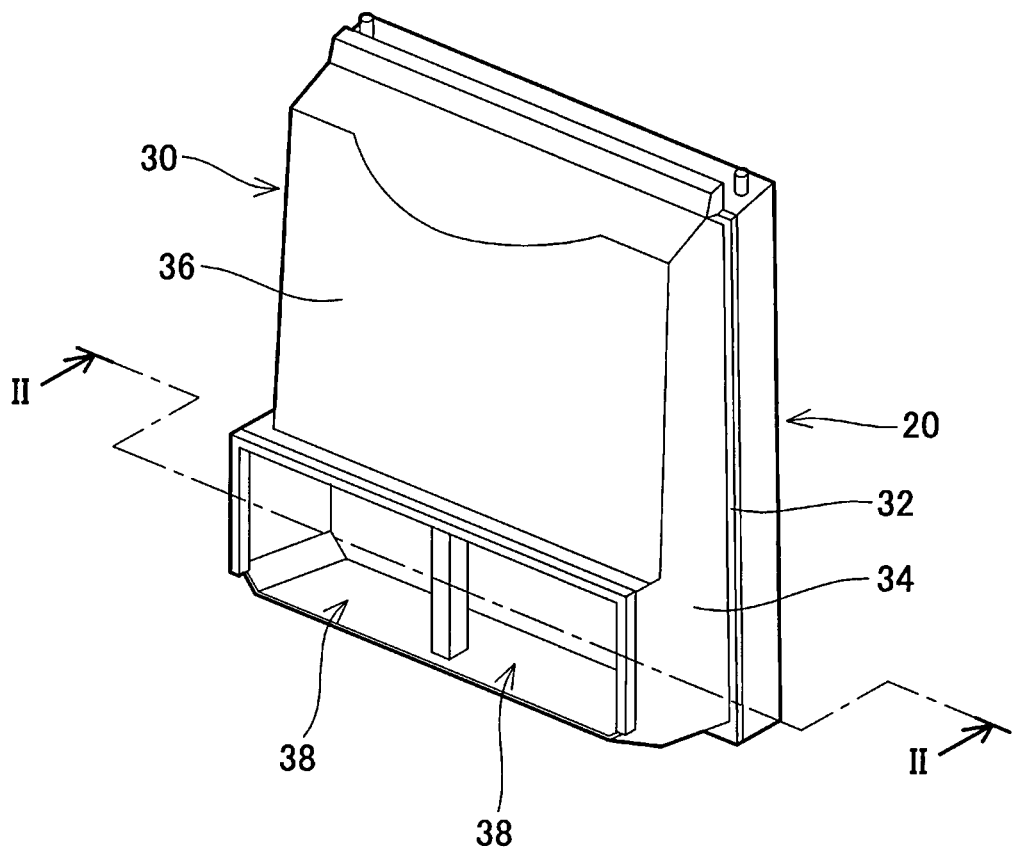
FIG. 1 is a perspective view of an air-cooling device according to a first embodiment.

An air-cooling device 10 according to a first embodiment shown in FIG. 1 is installed in a front compartment of a vehicle. The air-cooling device 10 is disposed rearward of a front grille. The air-cooling device 10 includes a radiator 20 and a duct 30.

Figure 2:
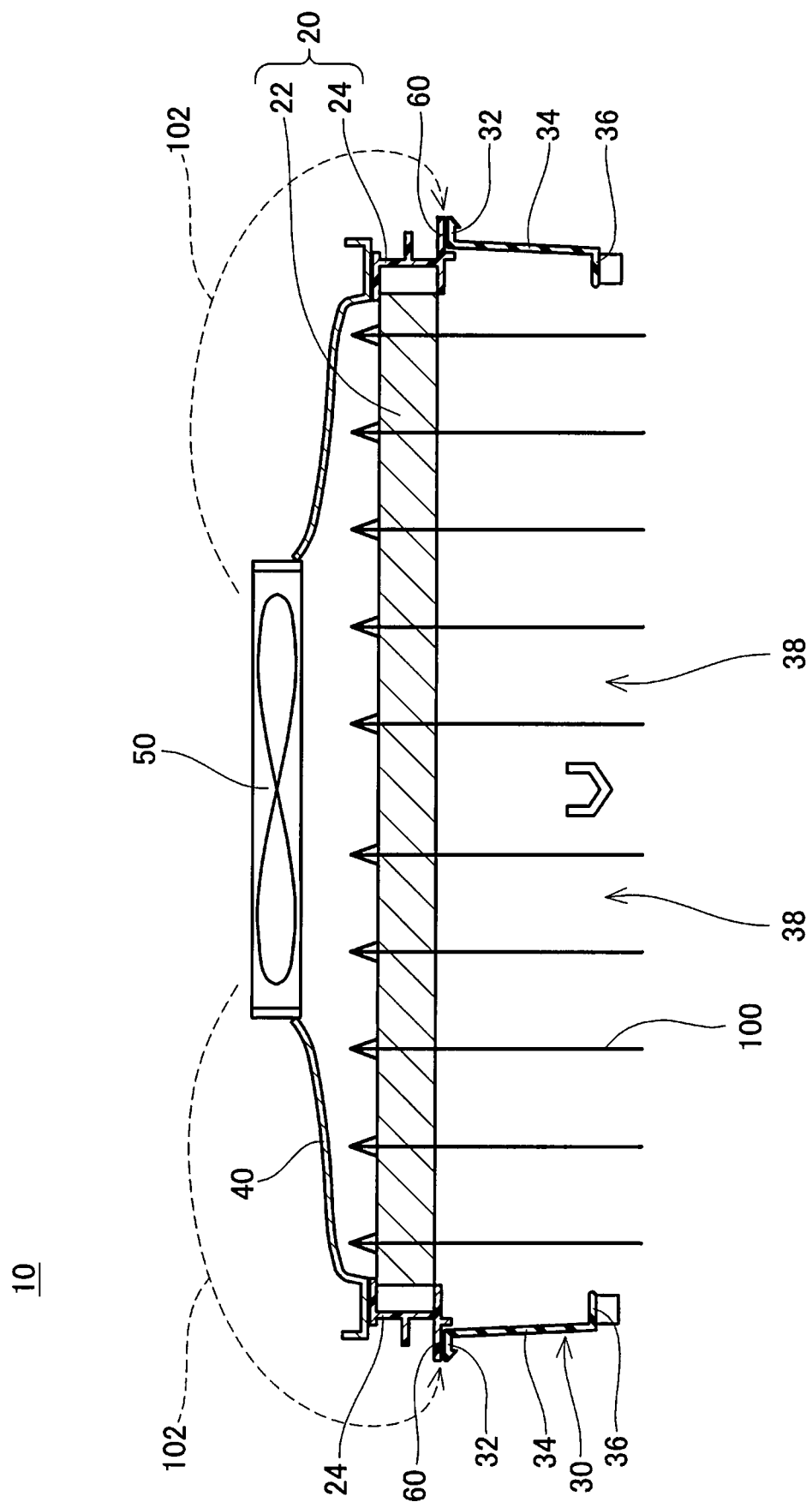
FIG. 2 is a sectional view taken along the line II-II shown in FIG. 1.

A coolant flows inside the radiator 20. The radiator 20 cools the coolant by heat exchange between the coolant and air. As shown in FIG. 2, the radiator 20 includes a radiator core 22 and a radiator tank 24. The radiator core 22 is made of a metal (for example, aluminum). The radiator core 22 includes a plurality of tubes in which the coolant flows and a plurality of cooling fins connected to the tubes. A flow path in which the air flows is provided (formed) by spaces between the tubes. When the air passes through the radiator core 22, the coolant in the radiator core 22 is cooled. The radiator tank 24 is connected to an outer peripheral portion of the radiator core 22. Specifically, the radiator tank 24 is connected to side surfaces in the outer side of the radiator core 22 in a vehicle width direction. The radiator tank 24 is a member made of resin. The radiator tank 24 may be made of a metal such as aluminum. The radiator tank 24 functions as a frame that supports the radiator core 22. In another embodiment, the radiator tank 24 may include a refrigerant flow path inside thereof. In such a case, the radiator tank 24 also functions as a branch flow path for causing the coolant to flow in each tube in the radiator core 22.

As shown in FIG. 1, the duct 30 is disposed forward of the radiator 20. The duct 30 includes a flange 32, a side wall 34 extending forward from the flange 32, and a cover 36 configured to cover the front surface of the radiator 20. As shown in FIG. 2, the duct 30 is fixed to the radiator 20 in a state in which the rear surface of the flange 32 is in contact with the front surface of the radiator tank 24. The duct 30 is fixed to the radiator 20 by snap-fitting. Therefore, there is a small clearance at a boundary portion 60 between the flange 32 and the radiator tank 24. As shown in FIGS. 1 and 2, the cover 36 includes openings 38. The openings 38 are disposed forward of the radiator core 22.

As shown in FIG. 2, the air-cooling device 10 includes a shroud 40 and a fan 50 that are provided rearward of the radiator 20. The shroud 40 covers the rear surface of the radiator core 22. A discharge port is provided at the center of the shroud 40, and the fan 50 is provided in the discharge port. As shown by arrows 100 in FIG. 2, when the fan 50 is operated, the air flows into the openings 38 of the duct 30 via the front grille. The air that has flowed into the openings 38 passes through the radiator core 22, and is discharged rearward from the fan 50. When the air passes through the radiator core 22, the coolant in the radiator core 22 is cooled. The air-cooling device 10 operates the fan 50 as necessary while the vehicle stops or the vehicle travels at a low speed. Also, while the vehicle travels at a high speed, the air flows as shown by the arrows 100 in FIG. 2, and the radiator core 22 is cooled. The air-cooling device 10 operates the fan 50 as necessary while the vehicle travels at a high speed as well.

Figure 3:
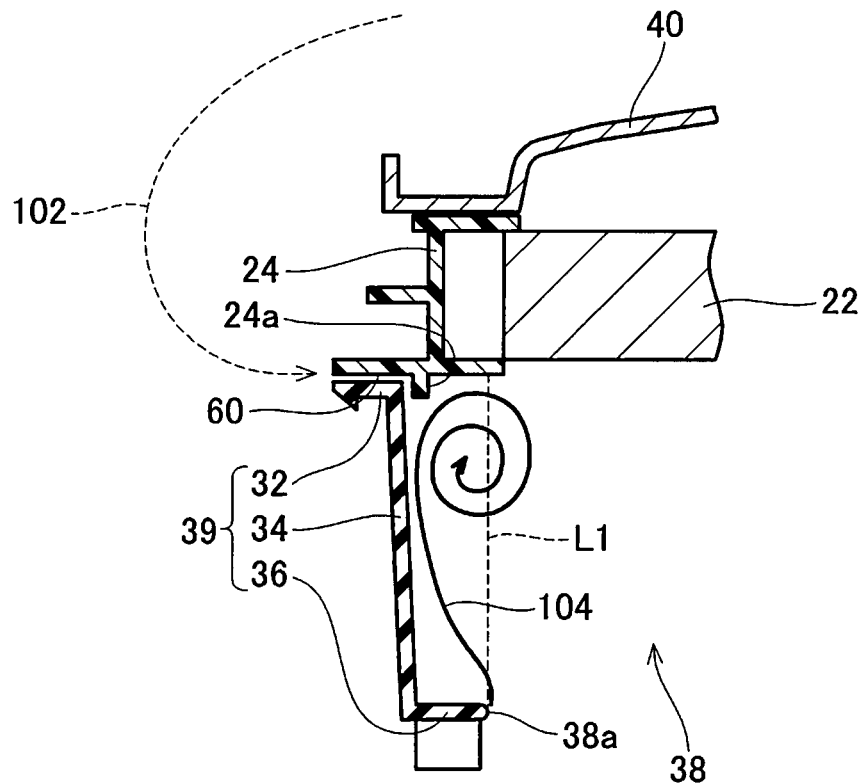
FIG. 3 is an enlarged sectional view of an outer peripheral portion of the air-cooling device according to the first embodiment.

As shown in FIG. 3, at a position adjacent to the opening 38, there is an air guide 39 that includes the flange 32, the side wall 34, and the cover 36 of the duct 30. The air guide 39 extends from the front surface of the radiator tank 24 to an end 38a of the opening 38. A straight line L1 in FIG. 3 represents a straight line that is virtually drawn from the end 38a toward the rear of the vehicle. The straight line L1 is a straight line that is parallel to a vehicle front-rear direction. As shown in FIG. 3, the front surface of the radiator tank 24 extends across the straight line L1, that is, the front surface of the radiator tank 24 extends from a position on one side of the straight line L1 to a position on an opposite side of the straight line L1. That is, the front surface of the radiator tank 24 extends from a position outward of the straight line L1 in the vehicle width direction to a position inward of (i.e., a position closer to the center of the vehicle than) the straight line L1 in the vehicle width direction. The boundary portion 60 between the radiator tank 24 and the duct 30 (specifically, the boundary portion between the front surface of the radiator tank 24 and the rear surface of the flange 32) is disposed outward of the straight line L1 in the vehicle width direction. The boundary portion 60 is disposed at a distance from the straight line L1. Therefore, there is a space between the straight line L1 and the side wall 34. A rib 24a that projects forward is provided on the front surface of the radiator tank 24. The rib 24a is disposed between the boundary portion 60 and the straight line L1. The rib 24a is disposed adjacent to the boundary portion 60, and extends along the boundary portion 60.

As described above, the fan 50 is operated to cause the air to flow into the radiator core 22. At this time, when the air that has passed through the radiator core 22 and the fan 50 as shown by arrows 102 in FIGS. 2 and 3 passes through the clearance at the boundary portion 60 and flows back into the duct 30, the cooling efficiency of the radiator core 22 is reduced. That is, the air that has passed through the radiator core 22 is air at high temperature heated by the radiator core 22. When such air at high temperature passes through the clearance at the boundary portion 60 and flows into the duct 30, the air at high temperature flows into the radiator core 22, and the cooling efficiency of the radiator core 22 is reduced. In contrast, as will be described below, in the air-cooling device 10 according to the first embodiment, the backflow of the air that has passed through the radiator core 22 is restrained. As shown in FIG. 3, in the air-cooling device 10 according to the first embodiment, when the straight line L1 that extends rearward from the end 38a of the opening 38 is drawn, the front surface of the radiator tank 24 extends across the straight line L1, that is, the front surface of the radiator tank 24 extends from a position on one side of the straight line L1 to a position on an opposite side of the straight line L1. That is, the radiator tank 24 is disposed rearward of the end 38a so as not to allow the air to pass through the radiator tank 24. Therefore, the air that has passed through the vicinity of the end 38a and flowed into the duct 30 easily flows into a space between the straight line L1 and the side wall 34. The air that has flowed into the space between the straight line L1 and the side wall 34 flows in a spiral manner in the vicinity of the boundary portion 60 as shown by an arrow 104 in FIG. 3. Particularly, since the rib 24a is provided to extend along the boundary portion 60, the air is guided by the rib 24a, and the air easily flows in a spiral manner. As described above, the air in a spiral manner is generated in the space in the vicinity of the boundary portion 60 in the duct 30, so that the air is less likely to flow from the clearance at the boundary portion 60 into the duct 30. Further, since the rib 24a is provided to extend along the boundary portion 60, fluid resistance in the clearance at the boundary portion 60 increases, and the air is less likely to flow into the boundary portion 60. Therefore, it is possible to restrain the air from flowing into the duct 30 through the clearance at the boundary portion 60. As described above, with the air-cooling device 10 according to the first embodiment, it is possible to restrain the air that has passed through the radiator core 22 from flowing back into the duct 30 through the clearance at the boundary portion 60. Therefore, with the air-cooling device 10 according to the first embodiment, when the fan 50 is operated, the radiator core 22 can be efficiently cooled.

Second Embodiment

Figure 4:
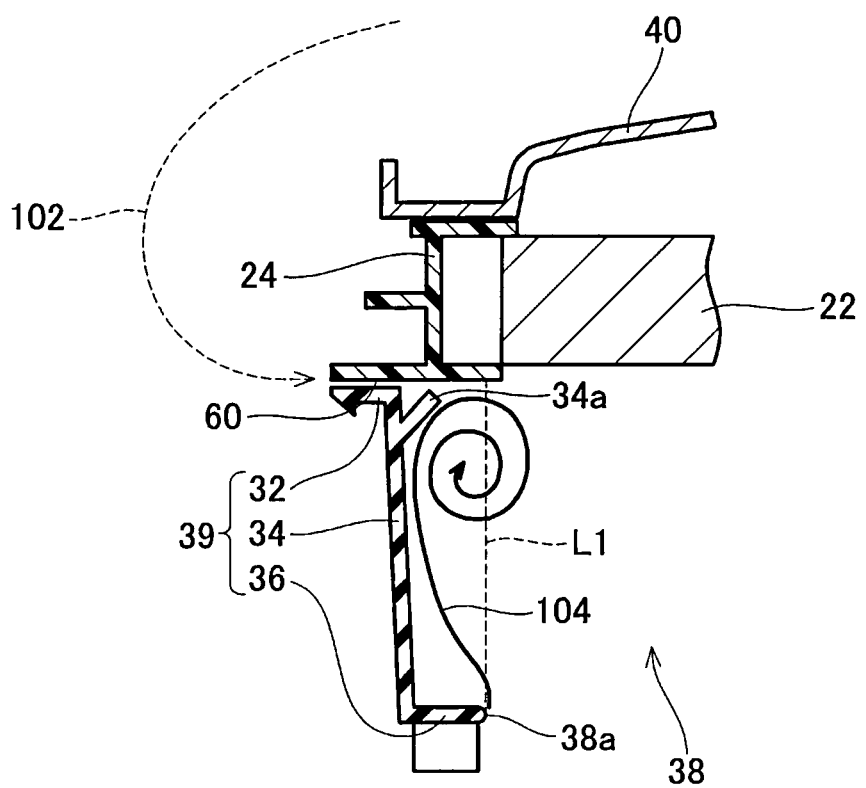
FIG. 4 is an enlarged sectional view of an outer peripheral portion of an air-cooling device according to a second embodiment.

An air-cooling device according to a second embodiment shown in FIG. 4 is different from the air-cooling device 10 according to the first embodiment in the position of the rib. Other configurations of the air-cooling device according to the second embodiment is equivalent to those of the air-cooling device 10 according to the first embodiment. As shown in FIG. 4, the air-cooling device according to the second embodiment does not include a rib on the front surface of the radiator tank 24, and includes a rib 34a on the inner surface of the side wall 34 of the duct 30. The rib 34a projects from the inner surface of the side wall 34 to the inner side. The rib 34a projects (extends) obliquely rearward from the inner surface of the side wall 34. The rib 34a is disposed in the vicinity of the boundary portion 60, and extends along the boundary portion 60.

In the configuration according to the second embodiment as well, the air easily flows into the space between the straight line L1 and the side wall 34, so that the air in a spiral manner is generated in the vicinity of the boundary portion 60 as shown by the arrow 104. Particularly, since the rib 34a is provided to extend along the boundary portion 60, the air is guided by the rib 34a, and the air easily flows in a spiral manner. As described above, the air in a spiral manner is generated in the space in the vicinity of the boundary portion 60 in the duct 30, so that the air is less likely to flow from the clearance at the boundary portion 60 into the duct 30. Further, in the configuration according to the second embodiment, since the rib 34a is provided on the inner surface of the side wall 34, fluid resistance in the clearance at the boundary portion 60 increases, and the air is less likely to flow into the clearance at the boundary portion 60. As described above, with the air-cooling device according to the second embodiment, it is possible to restrain the air that has passed through the radiator core 22 from flowing back into the duct 30 through the clearance at the boundary portion 60. Therefore, with the air-cooling device according to the second embodiment, when the fan 50 is operated, the radiator core 22 can be efficiently cooled.

In the above first and second embodiments, the frame of the radiator is constituted by the radiator tank connected to the outer peripheral portion of the radiator core. However, the frame of the radiator may be constituted by another member or other members.

Although the embodiments have been described in detail above, the embodiments are merely examples and do not limit the scope of the disclosure. The techniques in the present disclosure include various modifications and alternations of the specific examples illustrated above. The technical elements described in the disclosure exhibit technical usefulness individually or in various combinations, and are not limited to the combinations in the specific examples. In addition, the techniques illustrated in the disclosure achieve a plurality of objectives at the same time, and achieving one of the objectives itself has technical usefulness.

What is claimed is:

1. An air-cooling device mounted on a vehicle, the air-cooling device comprising:
   a radiator that includes a radiator core and a frame connected to an outer peripheral portion of the radiator core;
   a duct disposed forward of the radiator, the duct including an opening disposed forward of the radiator core and an air guide that extends from the frame to an end of the opening;
   a fan configured to cause air to flow from the opening to the radiator core; and
   a shroud,
   wherein
   the frame is between the shroud and the air guide,
   the frame has first and second ends opposite to each other in a vehicle width direction of the vehicle,
   the frame extends from the first end on one side of an imagination straight line to the second end on an opposite side of the imagination straight line, the imagination straight line being parallel to a vehicle front-rear direction of the vehicle and extending rearward from the end of the opening,
   a connecting portion between and connecting the frame and the air guide is located at a distance from the imagination straight line and extends in the vehicle width direction, and
   a rib protrudes from the frame in the vehicle front-rear direction crossing the vehicle width direction.

2. The air-cooling device according to claim 1, wherein the rib protrudes from a front surface of the frame in the vehicle front-rear direction.

3. The air-cooling device according to claim 2, wherein the rib extends perpendicularly to the connecting portion.

4. The air-cooling device according to claim 3, wherein
   the air guide includes a flange extending in the vehicle width direction, a cover, and a side wall extending between the flange and the cover, and
   the connecting portion is defined by a boundary portion between the frame and the flange of the air guide.

5. The air-cooling device according to claim 4, wherein the rib is disposed adjacent to the boundary portion in the vehicle width direction.

6. An air-cooling device mounted on a vehicle, the air-cooling device comprising:
   a radiator that includes a radiator core and a frame connected to an outer peripheral portion of the radiator core;
   a duct disposed forward of the radiator, the duct including an opening disposed forward of the radiator core and an air guide that extends from the frame to an end of the opening;
   a fan configured to cause air to flow from the opening to the radiator core; and
   a shroud,
   wherein
   the frame is between the shroud and the air guide,
   the frame has first and second ends opposite to each other in a vehicle width direction of the vehicle,
   the frame extends from the first end on one side of an imagination straight line to the second end on an opposite side of the imagination straight line, the imagination straight line being parallel to a vehicle front-rear direction of the vehicle and extending rearward from the end of the opening,
   a connecting portion between the frame and the air guide is located at a distance from the imagination straight line and extends in the vehicle width direction, and
   protrudes from an inner surface of the air guide in a direction crossing the vehicle width direction.

7. The air-cooling device according to claim 6, wherein the rib extends obliquely rearward from the inner surface of the air guide.

8. The air-cooling device according to claim 7, wherein
   the air guide includes a flange extending in the vehicle width direction, a cover, and a side wall extending between the flange and the cover, and
   the connecting portion is defined by a boundary portion between the frame and the flange of the air guide.

9. The air-cooling device according to claim 8, wherein the rib is disposed adjacent to the boundary portion in the vehicle width direction.

10. The air-cooling device according to claim 9, wherein the rib protrudes obliquely rearward from the inner surface on the side wall of the air guide.

* * * * *